United States Patent

Hontani et al.

[11] Patent Number: 5,949,906

[45] Date of Patent: *Sep. 7, 1999

[54] APPARATUS AND METHOD FOR EXTRACTING CHARACTER STRING

[75] Inventors: Hidekata Hontani, Tokyo; Shigeyoshi Shimotsuji, Sagamihara, both of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/568,512

[22] Filed: Dec. 7, 1995

[30] Foreign Application Priority Data

Dec. 8, 1994 [JP] Japan .................................... 6-305022

[51] Int. Cl.⁶ .................................................. G06K 9/80
[52] U.S. Cl. .......................................... 382/177; 382/229
[58] Field of Search .................................. 382/187, 177, 382/202, 203, 229, 190

[56] References Cited

U.S. PATENT DOCUMENTS

| | | | |
|---|---|---|---|
| 5,054,104 | 10/1991 | Yamaguchi | 382/309 |
| 5,191,612 | 3/1993 | Katsuyama et al. | 382/171 |
| 5,197,107 | 3/1993 | Katsuyama et al. | 382/209 |
| 5,335,290 | 8/1994 | Cullen et al. | 382/176 |
| 5,341,439 | 8/1994 | Clifford | 382/171 |
| 5,444,797 | 8/1995 | Spitz et al. | 382/192 |
| 5,559,902 | 9/1996 | Bose et al. | 382/263 |
| 5,724,445 | 3/1998 | Niki | 382/177 |

OTHER PUBLICATIONS

Keiji Gyohten, et al., "Extracting Characters and Character Lines in Multi–Agent Scheme", International Conference on Document Analysis and Recognition, Montreal, Canada, vol. 1, (pp. 305–308), 1995.

Akira Nakamura, et al., "A Method For Recognizing Character Strings From Maps Using Linguistic Knowledge", International Conference on Document Analysis and Recognition, Tsukuba, Japan, (pp. 561–564), 1993.

*Primary Examiner*—Jon Chang
*Attorney, Agent, or Firm*—Oblon, Spivak, McClelland, Maier & Neustadt, P.C.

[57] ABSTRACT

A character string region extracting apparatus comprises an extracting section for extracting a plurality of primitives from image information in which a character and a graphic pattern other than the character are mixedly present, a character string candidate region forming section for generating character candidate regions from the primitives and connecting the character candidate regions, thereby forming at least one character string candidate region, a character recognizing section for subjecting the character candidate regions included in the character string candidate region to character recognition, and a character string region extracting section for extracting a character string region from the character string candidate region by the character recognition.

19 Claims, 11 Drawing Sheets

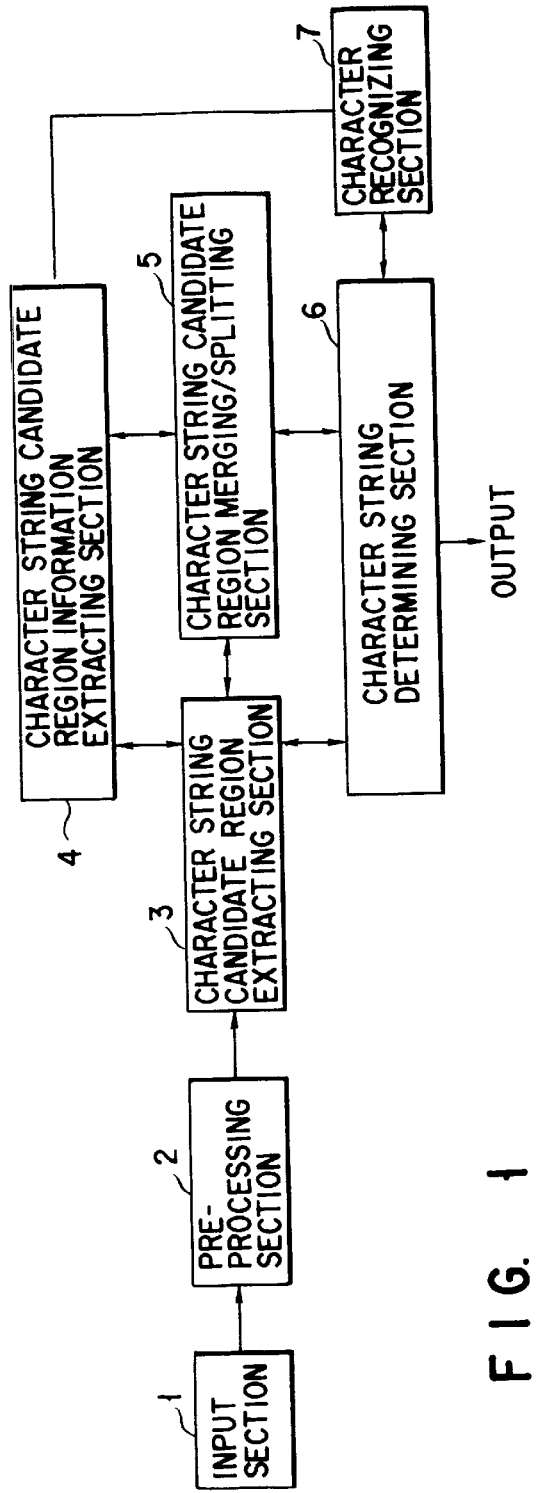
F I G. 1
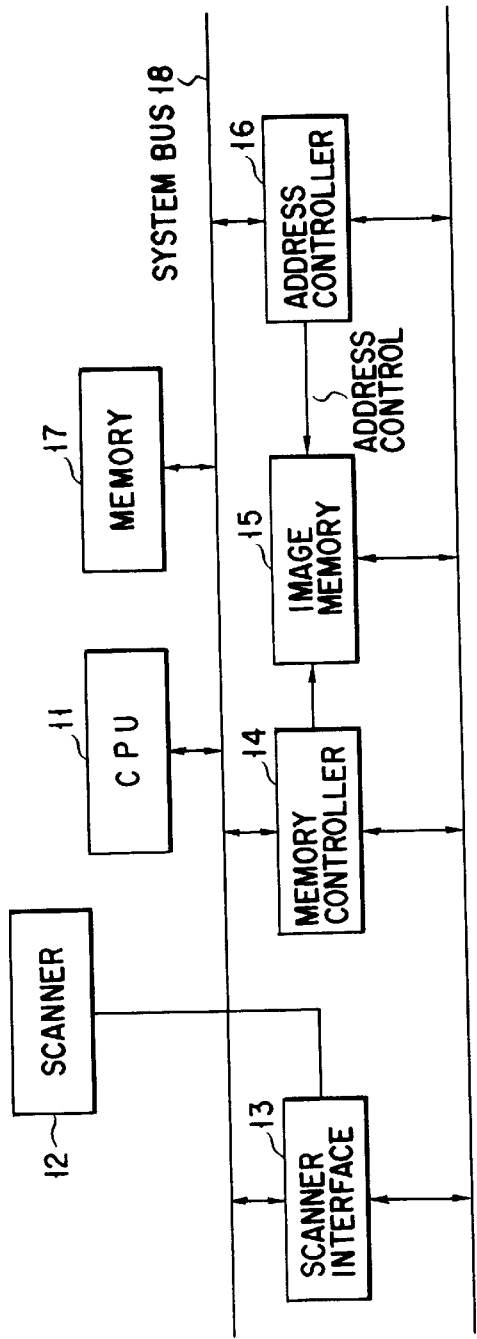
F I G. 2

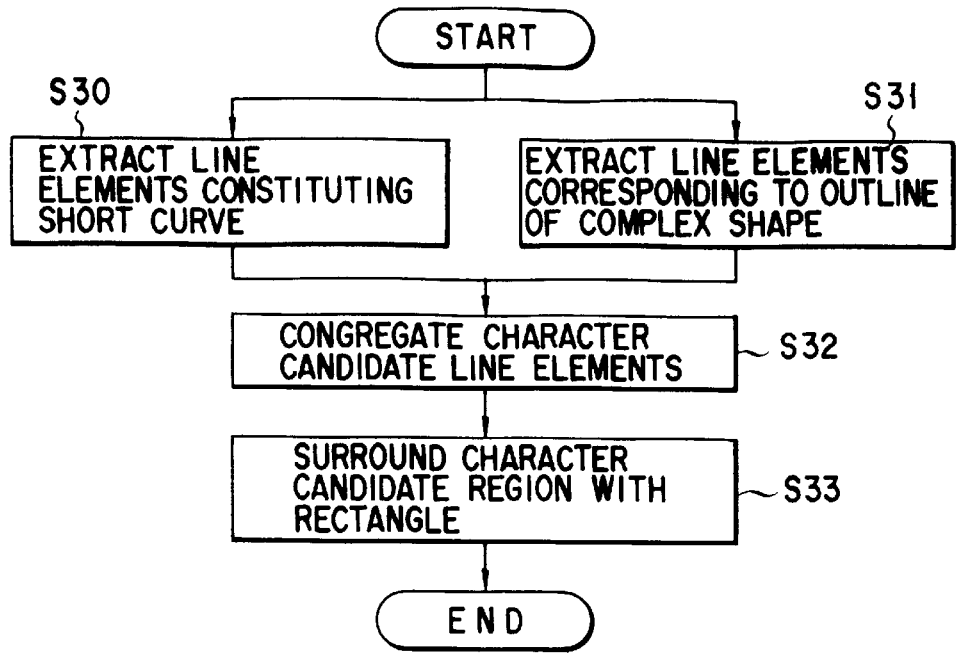
F I G. 4
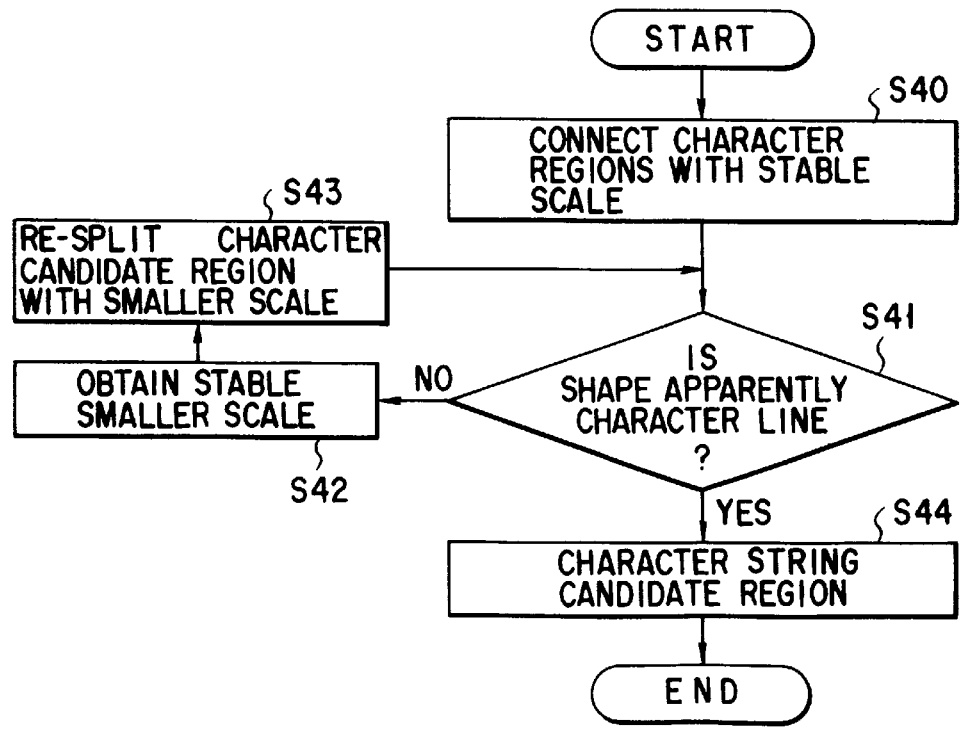
F I G. 5

APPARATUS AND METHOD FOR EXTRACTING CHARACTER STRING

BACKGROUND OF THE INVENTION

1. Field of the Invention

The present invention relates to an apparatus and a method for extracting a character string for recognizing characters on a paper sheet on which characters and non-character patterns are mixedly present.

2. Description of the Related Art

Paper sheets on which characters and graphic patterns other than characters are mixedly present includes printed matters such as slits, drawings, maps, documents, books and magazines, as well as handwritten memoranda.

In the field of techniques for automatically recognizing what appears on the paper sheets, a technique for separating graphic pattern regions and character regions is indispensable.

In the conventional character-region extracting method, attention has been paid to the fact that the size of a character is generally smaller than that of a graphic pattern other than the character. In this method, a character region is extracted by measuring the size of a graphically merged region and comparing this size with a known character size. By this method, however, a character region cannot exactly be extracted if a character is in contact with a graphic pattern other than the character.

A method for solving this problem has been proposed. In this method, in order to separate a graphical pattern other than a character from the character contacting with the graphical pattern, a geometrical shape such as a circle or a straight line is assumed on the contacting background pattern on a paper sheet, the assumed shape is extracted from patterns on the paper sheet, and the non-extracted remaining pattern is recognized as a character. In this case, it is likely that a non-character pattern is included in the pattern extracted as a character candidate. In this case, the non-character pattern is simply omitted from the character candidates on the basis of geometric characteristics such as the size of the non-character pattern, the positional relationship between the non-character pattern and a character candidate pattern. Consequently, when the geometrical characteristics of the character are similar to those of the background pattern, the character string cannot be extracted exactly.

There are many graphical patterns, such as Chinese characters each comprising a left-hand radical and a right-hand radical, blurred characters, etc., each of which is formed by merging adjacent graphical patterns. A character string is formed by merging characters. When graphic patterns are merged, it is necessary to determine the range of graphic patterns to be merged (hereinafter referred to as "pattern merging range"). Since this range varies, depending on the size of each character or the interval of characters (hereinafter referred to as "character interval"), this area must be properly determined for each area on the paper sheet if characters and character strings of different sizes are mixedly present on the paper sheet. In the conventional character region extracting method, the pattern merging range must be determined in advance. If the location at which a character is to be written is unknown, the pattern merging range of the same value is applied to the entire area of the paper sheet. If the size of each character or the interval of characters differs from paper sheet to paper sheet, the value of the pattern merging range must be varied for each paper sheet. In addition, if characters of different sizes and character strings of different character intervals are mixedly present, the above conventional method is not applicable.

In most of the prior art, it is required to assume the direction of the character string to be horizontal or vertical, or to assume a mark of the direction of the character string near the character string, for example, a long line element written in parallel to the character line. Consequently, it is difficult to exactly extract the character string from the face of an ordinary paper sheet on which character strings are arranged at given locations in given directions.

In the case where the sizes of characters, the character intervals and the directions of character strings are unknown, it is still more difficult to form a character string in an area where graphic patterns are concentrated. In particular, when many non-character patterns are included in character candidate patterns, it is necessary to determine which pattern should be treated as character and incorporated in the character string, to determine the size of the character, and to extract the character string while assuming the direction of the character string. Thus, it is difficult and time-consuming to exactly extract the character string.

In the conventional character string region extracting apparatus and method, since the geometric shape of the background pattern needs to be assumed in order to extract the character region contacting with the background pattern, exact character region extraction cannot be performed when it is difficult to assume the shape of the background pattern. In particular, if a non-character pattern is included in graphic patterns extracted as character candidates, the criterion for determining whether or not the included non-character pattern is a real character pattern is limited to only the geometric features. Thus, it is difficult to precisely extract the character string, owing to a background graphic pattern similar in size to a character in a surrounding area.

In the conventional apparatus and method for extracting a character string, when a single character candidate, for example, a Chinese character, is prepared by coupling some graphic patterns, or when some character candidates are coupled to prepare a character string candidate, it is necessary to determine the pattern merging range. In the prior art, the value of the pattern merging range is preset and the same value is applied to the entire face of the paper sheet. Consequently, when the size of character or the character interval varies from sheet to sheet, the value of the pattern merging range must be changed each time the size of the sheet varies. Furthermore, if characters of different sizes and character strings of different character intervals are mixedly present on the same paper sheet, the above conventional method is not applicable.

In most of the prior art, it is presupposed that character strings can be read horizontally or vertically. Consequently, it is difficult to exactly extract the character string from the face of an ordinary paper sheet on which character strings are arranged at given locations in given directions.

In the case where the sizes of characters, the character intervals and the directions of character lines are unknown, it is still more difficult to form a character string in an area where graphic patterns are concentrated, in particular, in an area where many non-character patterns are included in character candidate patterns.

SUMMARY OF THE INVENTION

The object of the present invention is to provide an apparatus and a method for extracting, with no strict knowledge of graphic patterns other than characters, a character string from the face of a paper sheet on which characters are present with given character sizes, character locations, character intervals and directions of character strings.

According to the present invention, there is provided a character string region extracting apparatus comprising: an extracting section for extracting a plurality of elemental segments from image information in which a character and a graphic pattern other than the character are mixedly present; a character string candidate region forming section for generating character candidate regions from the elemental segments and merging the character candidate regions, thereby forming at least one character string candidate region; a character recognizing section for subjecting the character candidate regions included in the character string candidate region to character recognition; and a character string region extracting section for extracting a character string region from the character string candidate region by the character recognition.

According to the present invention, there is provided a character string region extracting apparatus comprising: an extracting section for extracting a plurality of elemental segments from image information in which a character and a graphic pattern other than the character are mixedly present; a character string candidate region forming section for forming a character string candidate region from the elemental segments; a character recognizing section for subjecting the character string candidate region to character recognition; and an apparent character string determining section for determining whether the character string candidate region is a character string region on the basis of a result of the character recognition by the character recognizing means.

According to the present invention, there is provided a character string region extracting method, comprising the steps of: extracting elemental segments from input image information; forming a character string candidate region from the elemental segments; subjecting the character string candidate region to character recognition; and determining whether the character string candidate region is a character string region, on the basis of a result of the character recognition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a functional block diagram of a character string region extracting apparatus according to an embodiment of the present invention;

FIG. 2 shows an example of hardware construction of the embodiment;

FIG. 4 is a flow chart illustrating the flow of character-candidate-region extraction processing in the embodiment;

FIG. 5 is a flow chart illustrating the flow of character-line-candidate-region extraction processing in the embodiment;

DETAILED DESCRIPTION OF THE PREFERRED EMBODIMENTS

Figure 3:
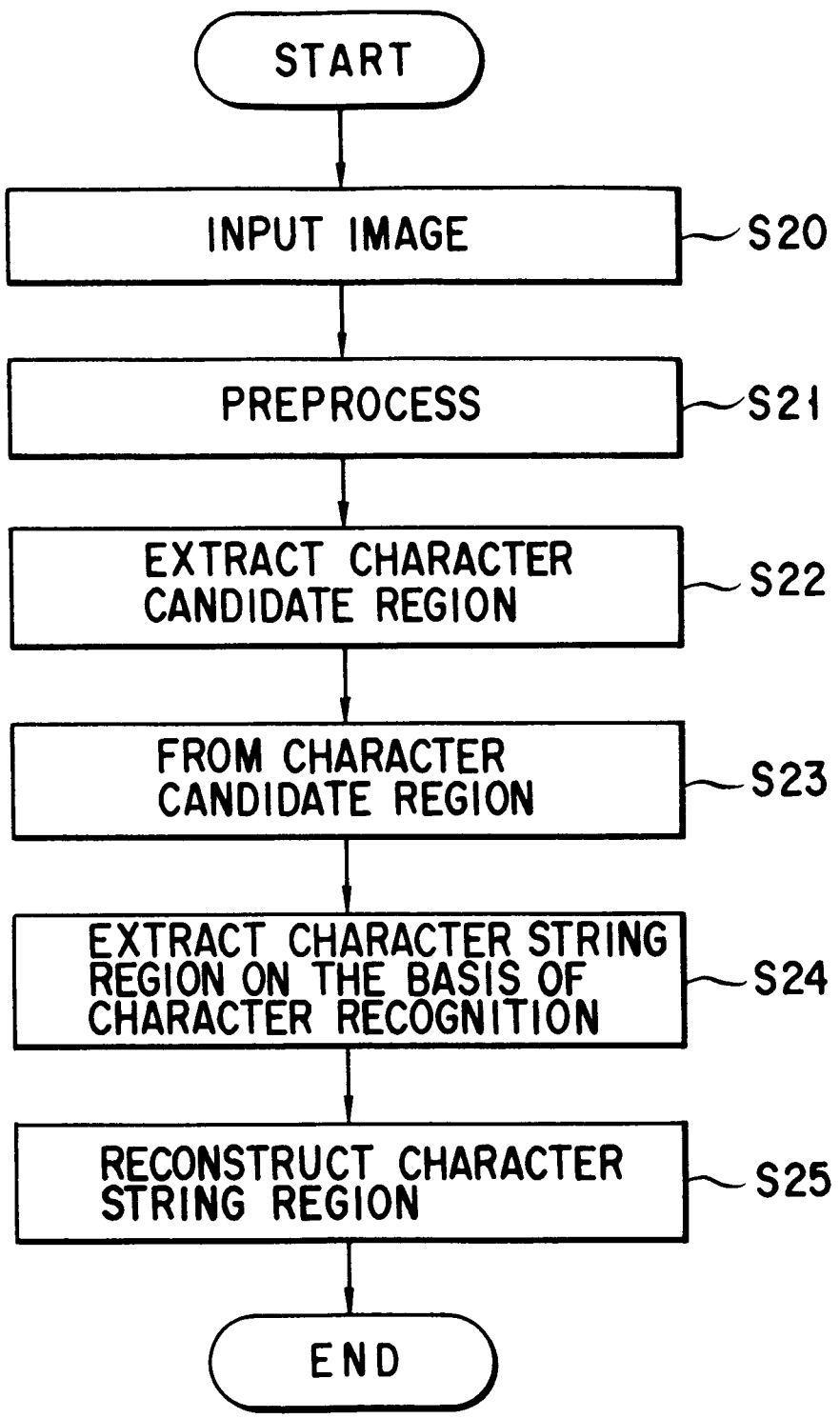
FIG. 3 is a flow chart illustrating the flow of general processing in the embodiment.

An embodiment of the present invention will now be described with reference to the accompanying drawings.

As is shown in FIG. 1, a character region extracting apparatus according to the embodiment comprises an input section 1, a preprocessing section 2, a character string candidate region extracting section 3, a character string candidate region information extracting section 4, a character string candidate region merging/splitting section 5, a character string determining section 6, and a character recognizing section 7.

The main function of each section will now be described.

The input section 1 acquires a digital image of a character or graphic pattern appearing on the face of a paper sheet. The input section 1 may comprise a device for acquiring an image on the paper sheet as an optical image and converting the optical image into an electric signal, e.g. an image scanner. The preprocessing section 2 extracts primitives such as line elements from the acquired image. The character string candidate region extracting section 3 merges proper ones of the extracted primitives, thereby producing a character candidate region and further producing a character string candidate region of one or more character candidate regions. The character string candidate region information extracting section 4 extracts character string information such as the directions, sizes and intervals of character strings, on the basis of a distribution of character string candidate regions on the paper sheet and a result of character recognition (described later).

The character string candidate region merging/splitting section 5 merges and splits character string candidate regions by using the above-mentioned character string information, thereby producing a more proper character string candidate region. The character string determining section 6 determines whether the produced character string candidate region is a character string. For this determination, the character recognizing section 7 is also used in addition to the data on the shape of the character string candidate region. Character candidates which have finally been determined to be characters are output as, e.g. character codes. The output character codes, etc. are stored in a storage device such as a RAM or a hard disk or displayed on a display such as a CRT. In this case, the character codes may be stored in combination with attribute information on the coordinates of the characters on the paper sheet, the sizes and directions of the characters, etc. The attribute information can be easily obtained by conventional means (not shown).

FIG. 2 shows an example of a hardware structure for realizing the character region extracting apparatus of the present embodiment. The character region extraction processing is carried out by a processor. In the structure shown in FIG. 2, a processor 11 controls the entire apparatus. An image on the paper sheet, which is to be input, is input as a digital image by using an image scanner 12. The input digital image is stored in an image memory 15 via a scanner interface 13 and an image bus 19 under the control by an image memory controller 14. An address controller 16 carries out address control for the image memory 15. The processor 11 carries out the character region extraction processing in accordance with a character region extraction program prestored in a memory 17. Character codes, etc. obtained by the processing are temporarily stored in the memory 17 and transferred to a storage device such as a hard disk or a display device (not shown) such as a CRT on an as-needed basis. The storage device such as a hard disk or the display device such as a CRT is connected to a system bus 18.

Instead of the structure shown in FIG. 2, the character region extracting apparatus of the present embodiment may be entirely constructed by hardware. Alternatively, only desired ones of the functional blocks shown in FIG. 1 may be constructed by hardware and the other blocks may be constructed by software.

FIG. 3 is a flow chart illustrating the outline of the character region extraction processing by the character region extracting apparatus of the present embodiment. At first, the outline of the character region extraction processing will be described.

In step S20, a character or a graphic pattern appearing on the face of the paper sheet is input as a digital image. In step S21, a preprocess is performed. In the preprocess, the input image is subjected to preprocessing (described later) necessary for extraction of a character candidate region and primitives are extracted. In step S22, a character candidate region extraction process is performed. In this process, a character region is compared with a background pattern. If the character region is regarded as a region with a complex shape or a small merged region, as compared to the background pattern, the character region is extracted as a character candidate region. Thereby, a character region contacting with the background pattern, too, can be extracted even if the shape of the background pattern cannot be assumed. In step S23, a process for forming the character string candidate region is performed.

As has been described above, separate graphical patterns need to be merged to form the character candidate or character string candidate. In this process, distribution information on the character string candidate pattern is obtained to determine a proper pattern merging range for each graphic pattern. In order to obtain the distribution information, the character candidate patterns are merged on the basis of various pattern merging ranges, and the variation in relationship of connection between the character candidate patterns is found in relation to the variation in pattern merging range. The variation in relationship of connection is expressed by a three structure. Based on the three structure, the stable connecting relationship in relation to the variation in merging range is found with respect to each character candidate region.

In step S24, a character string extraction process is performed. If only the complexity and size of patterns are considered as standards for determination, many background patterns are included in the character candidate regions. In this process, the obtained character string candidate region is subjected to a character recognition process. Depending on whether or not the character string candidate region can be recognized as a character, the character string candidate region is divided into a character region and a non-character region. In addition, a pattern determined to be a non-character on the basis of the shape of merged patterns or the result of character recognition is divided into character string candidate regions of smaller merging ranges. At the time of the division, the merging ranges are determined to have a merging relationship as stable as possible, with reference to the tree structure of the merging relationship. It is also determined by character recognition whether the newly produced character string candidate regions are character patterns or non-character patterns. The processes for character recognition and division of the character candidate region are repeated until the character candidate region is determined to be a character pattern or cannot be divided.

In step S25, a character string region reconstruction process is performed. Based on the pattern determined by character recognition to be a character region, the sizes of characters and directions of character strings in the character region can be estimated. In this process, the character string region is reconstructed with reference to the sizes of characters and the directions of character strings.

The character region extraction process of the present embodiment will now be described in greater detail.

After the digital image of the character or pattern appearing on the paper sheet is input from the input section 1 in step S20, the input image is subjected to the preprocess in the preprocessing section 2, which is necessary for extracting the character candidate region, thereby extracting the primitives. In the present embodiment, in the preprocess, line thinning and polygonal line approximation to obtain thin line element, contour tracing and polygonal line approximation to obtain contour line element, and corresponding the thin line element to the contour line element are performed. These processes are carried out by using methods described, for example, in "A high speed raster to vector conversion using special hardware for contour tracking" (IAPR workshop on CV—Special hardware and industrial application, 1988, pp. 18–23) and "Pattern classification and scene analysis" (A Wiley-interscience Publication, pp. 338–339).

In step S22, the character string candidate region extracting section 3 extracts a pattern ("character candidate pattern") considered to be a character from the face of the paper sheet. In this process, if there is a knowledge of the shape of a background pattern other than characters, the background pattern is extracted and the non-extracted pattern is treated as a character candidate pattern. If there is no knowledge of the background pattern, a region with a complex distribution of line patterns is treated as a character candidate region. For example, complexity in shape of a contour, shortness of line elements constituting a pattern, etc. are used as standards for determining the complexity of distribution. The extracted region is enclosed by a rectangle in order to obtain a base line for character recognition to be performed later. The direction of the longer sides of the rectangle is determined in consideration of the inclination of the pattern. The inclination of the pattern is obtained, for example, by using a secondary moment of the pattern or the remotest two points on the contour.

FIG. 4 shows an example of the character candidate region extraction process. In this process, a line element forming a short curve pattern and corresponding to a contour of a complex shape is extracted as a constituent element of a character. A line element shorter than a predetermined threshold value is extracted from a thin line element as the line element constituting the short curve pattern. A flag of "1" is set to each of line elements constituting the selected line element string (step S30). As regards the line element corresponding the contour pattern with a complex shape, the contour element is referred to and a thin line element corresponding to only the contour element shorter than a predetermined threshold value is extracted (step S31). Of the extracted line elements, the line element with the flag of "1" is a candidate line element.

Of the character candidate line elements, graphically merged ones are merged to form a character candidate region (step S32). The inclination of the character pattern is obtained from the secondary moment of the circumference of a convex null of each character candidate pattern. A minimum rectangle which has a side parallel to the obtained inclination and is capable of including the character candidate pattern is found and set as a region of the character candidate pattern (step S33).

As will be described later, in the present embodiment, character recognition is adopted in extracting a character string. Thus, even if many patterns other than characters are included in character candidate patterns, the character string can be exactly extracted.

In step S23 in FIG. 3, the character string candidate region extracting section 3 interconnects adjacent character candidate regions, thereby forming a character string candidate. FIG. 5 is a flow chart for forming the character string candidate region. When the character candidate patterns are merged, the range of adjacent patterns to be merged is determined (step S40). Hereinafter, this "range" will be referred to as "scale".

Figure 6:
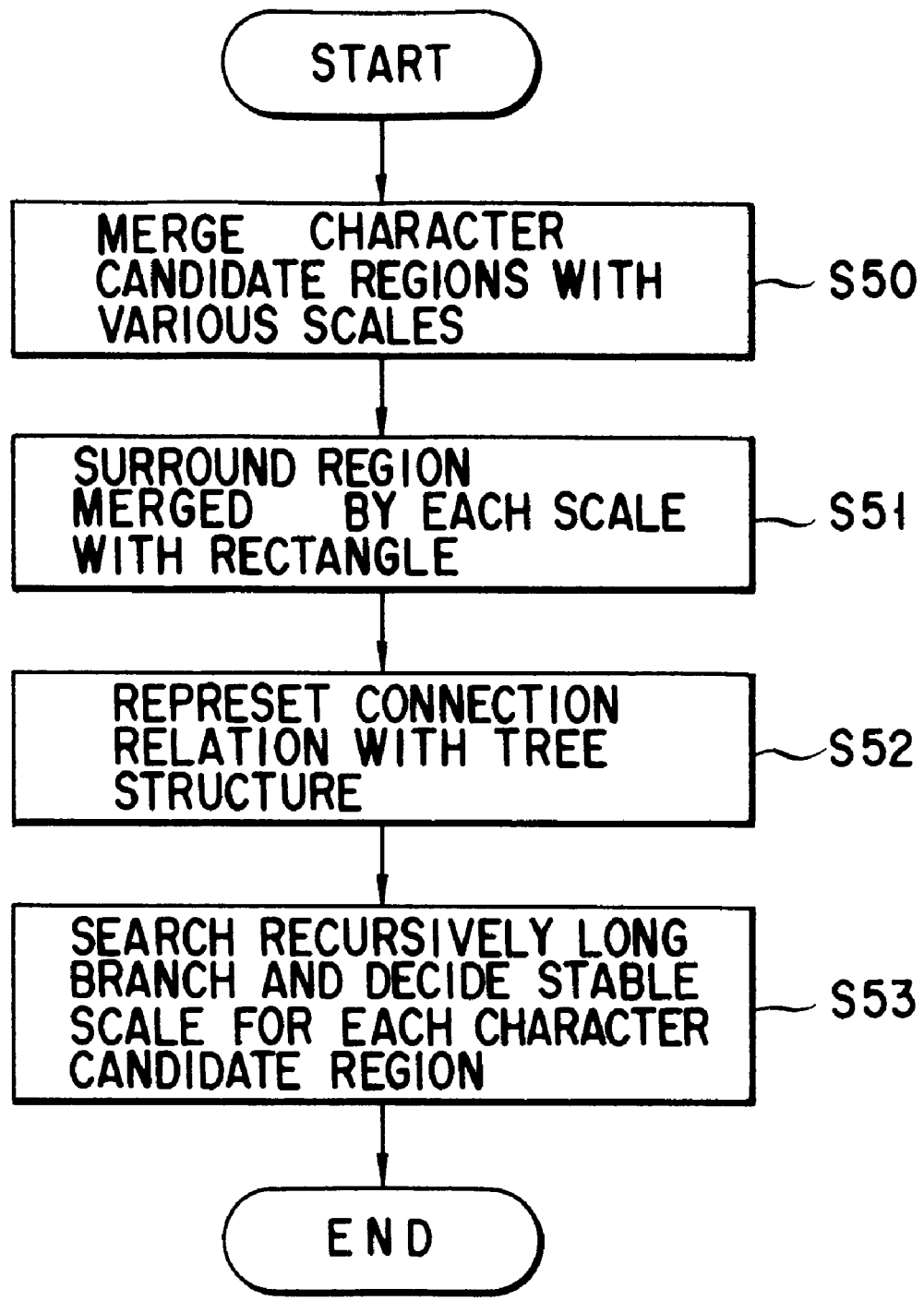
FIG. 6 is a flow chart illustrating the flow of processing for extracting distribution information of the character candidate region in the embodiment.

An example of the method of determining the scale will now be described with reference to FIG. 6. In this embodiment, a rectangular region of each character candidate pattern is enlarged, with the center of the rectangular region being set as a reference point. Mutually adjoining character candidate patterns of enlarged rectangles are merged. The magnification of the enlarged rectangle corresponds to the aforementioned scale. A scale graduation Δs and a maximum value S are preset, and the scale is varied in units of Δs between 1.0 and S. Thus, the character candidate patterns are merged. As the scale increases, character candidate patterns in a greater range are merged (step S50). The shape of a merged pattern is represented by a rectangle including all patterns which have been merged. The inclination of the rectangle is found by the secondary moment of the convex null including all central points of the character candidate patterns which have been merged (step S51). Then, a variation in connection relation due to a variation in scale is represented by a three structure (step S52). The tree structure is formed by using the character string candidate region information extracting section 4.

Figure 7:
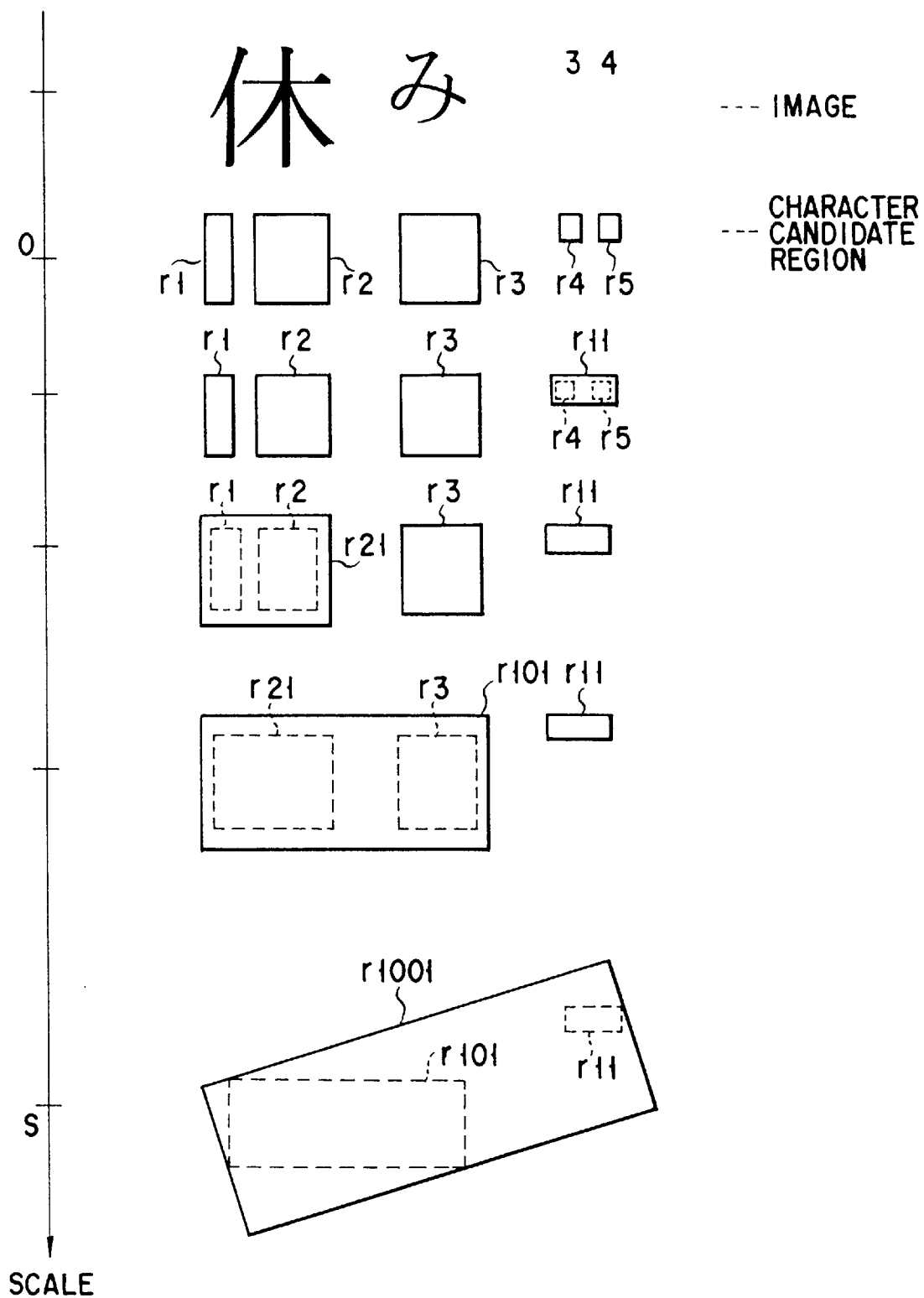
FIG. 7 is a view for describing the variation of the character candidate region at the time the pattern merging range is varied.

FIG. 7 is a view for describing the variation in connection relation of the character candidate patterns due to the variation in scale or pattern merging range.

Figures 8A, 8B:
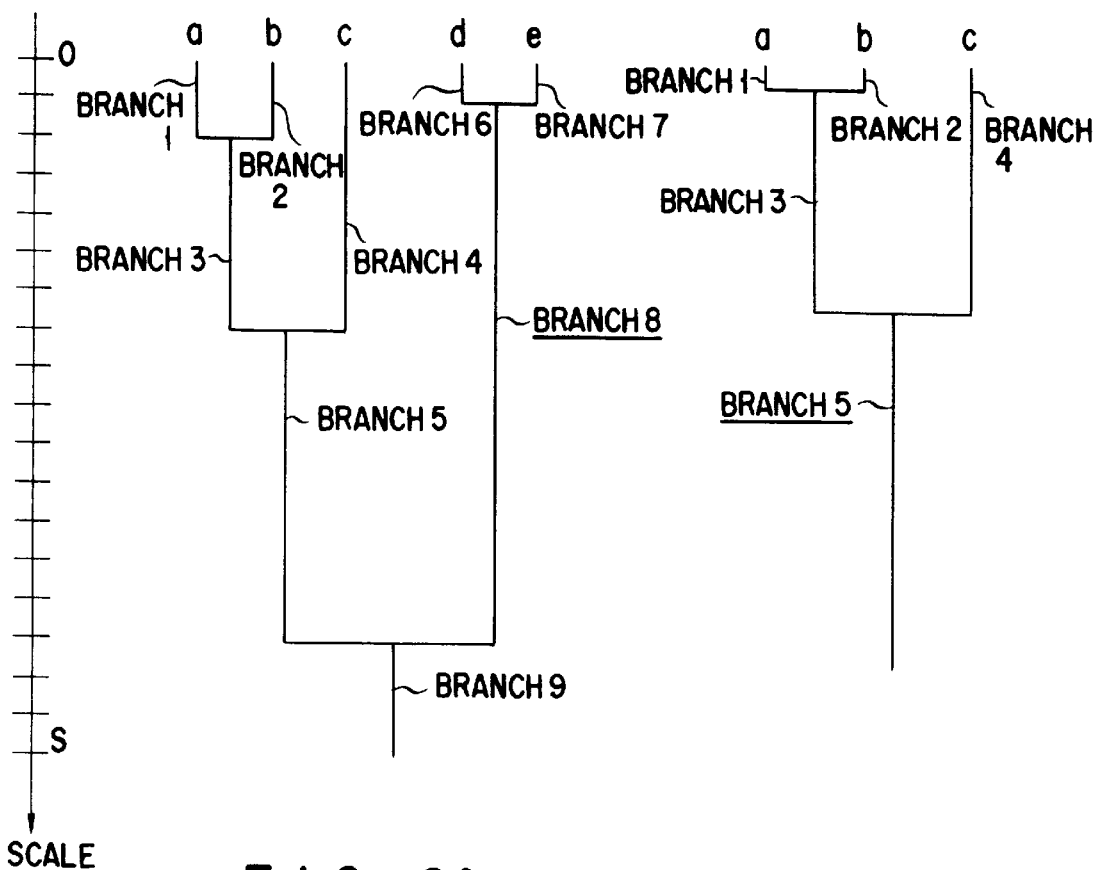
FIGS. 8A and 8B show tree structures representing the distribution information of the character candidate region.

It is understood that character candidate regions r1 to r5 including "イ", "𣏌", "ヰ", "3" and "4", respectively, are merged in accordance with an increase in scale, and merged regions r11, r21, r101 and r1001 are formed. In particular, the merged region r1001 is a rectangle in which the merged regions r11 and r101 are inscribed. FIG. 8A shows a tree structure representing the variation of rectangles of the character candidate patterns shown in FIG. 7 in relation to the variation in scale. In FIG. 8, patterns a, b, c, d and e correspond to "イ", "𣏌", "ヰ", "3" and "4", respectively. In the tree structure, the length of each branch corresponds to a degree of the scale over which a merged pattern is not varied. Specifically, a long branch indicates the state in which the character candidate pattern associated with the long branch is isolated from the other surrounding patterns.

The isolated pattern is extracted and a pattern stable to the variation in scale is obtained in order to form a character string candidate region. The long branch is recursively searched (step S53). For example, in FIG. 8A, there are nine branches, and branch 8 is longest. Thus, the pattern associated with the branch 8, i.e. a coupled pattern of patterns d and e, is stable. FIG. 8B shows the branches associated with the other patterns a, b and c. Of these branches, branch 5 is longest. Thus, the pattern associated with the branch 5, i.e. a coupled pattern of patterns a, b and c, is determined as another stable pattern.

According to this processing, each character candidate pattern is included in any of stable patterns. In this manner, the scale for merging character candidates is chosen for each character candidate pattern.

In the meantime, a pattern stable to the variation in scale is not necessarily a character string. Thus, the character string determining section 6 determines whether the stable pattern is apparently a character string. As regards a stable pattern which is obviously determined, on the basis of the shape thereof, to be not a character string, the most stable scale among the scales less than the current scale is obtained for each character candidate region by referring to the tree structure of connection relation (step S42). This stable pattern is split according to the connection relation based on the obtained scale (step S43).

The presence of an apparent character string is determined by the combination of the following conditions: whether constituent elements are arranged in a straight line, whether constituent elements have a substantially equal height, whether constituent elements are arranged at regular intervals, whether the interval of constituent elements is sufficiently narrow, whether constituent elements have a substantially equal area, whether constituent elements have a substantially equal inclination, whether constituent elements have a substantially equal width, etc. In this embodiment, the presence of an apparent character string is determined on the basis of two conditions: 1) whether constituent elements are arranged in a straight line and 2) whether constituent elements have a substantially equal height. The straight-line arrangement is determined on the basis of the flatness of arrangement of central points of the respective constituent elements, and the substantial equality in height is determined by comparing orthogonal projection images of the respective constituent elements on straight lines perpendicular to the direction of arrangement of the central points of the elements. These processes are carried out by using the character string candidate region information extracting section 4.

Figure 9A:
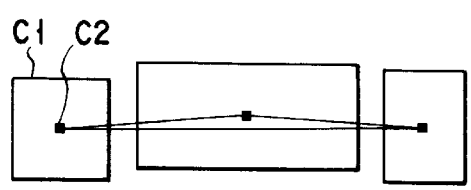
FIGS. 9A to 9D are views for describing the method of finding an apparent geometric character string of merged character candidate regions.
Figure 9B:
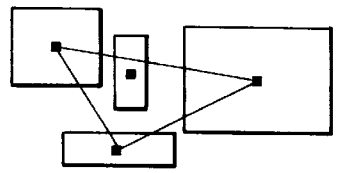
Figure 9C:
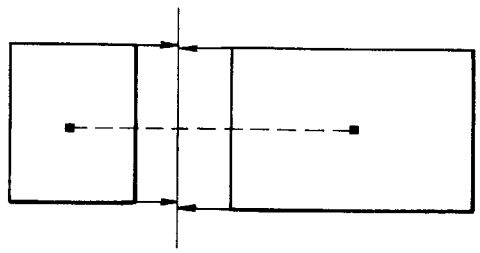
Figure 9D:
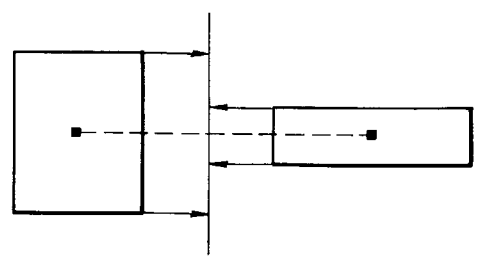

FIGS. 9A to 9D show an example of a method of determining the presence of the apparent character string. Numeral c1 denotes the constituent element and c2 denotes the central point thereof. The flatness of arrangement of the central points was evaluated on the basis of the value of $S/(L^2)$, wherein L=the length of the circumference of the convex null of all central points and S=the area. If this value is less than a predetermined value, it is determined that the constituent elements of the stable pattern are substantially arranged in a straight line. FIG. 9A shows an example in which the convex null is substantially flat, and FIG. 9B shows an example in which the convex null is not substantially flat. The height of the constituent elements is determined to be substantially equal when the respective elements are projected onto the straight line perpendicular to the angle of inclination of the region and the displacement of upper and lower edges of the projected region is less than a predetermined value. FIG. 9C shows an example in which the height of the constituent elements is substantially equal, and FIG. 9D shows an example in which the height is not substantially equal. A stable pattern which has been determined to have a substantial straight-line arrangement and a substantially equal height is determined to be a character string candidate pattern (step S44 in FIG. 5).

If a character candidate pattern is not merged to another character candidate pattern and is isolated, it is necessarily determined to be an apparent character string. Thus, the splitting operation is completed within a limited number of times of operations. When the presence of the apparent character string is not determined, the pattern is split to find a stable branch in a smaller scale on the basis of the tree structure shown in FIG. 8. Finally, the character candidate region is necessarily included in any of the character string candidate regions.

In step S24 in FIG. 3, the formed character string candidate region is delivered to the character recognizing section 7, and it is determined whether or not the character string candidate region is a character string. The character recognizing section 7 recognizes only the character candidate patterns included in the character string candidate region.

Figure 10:
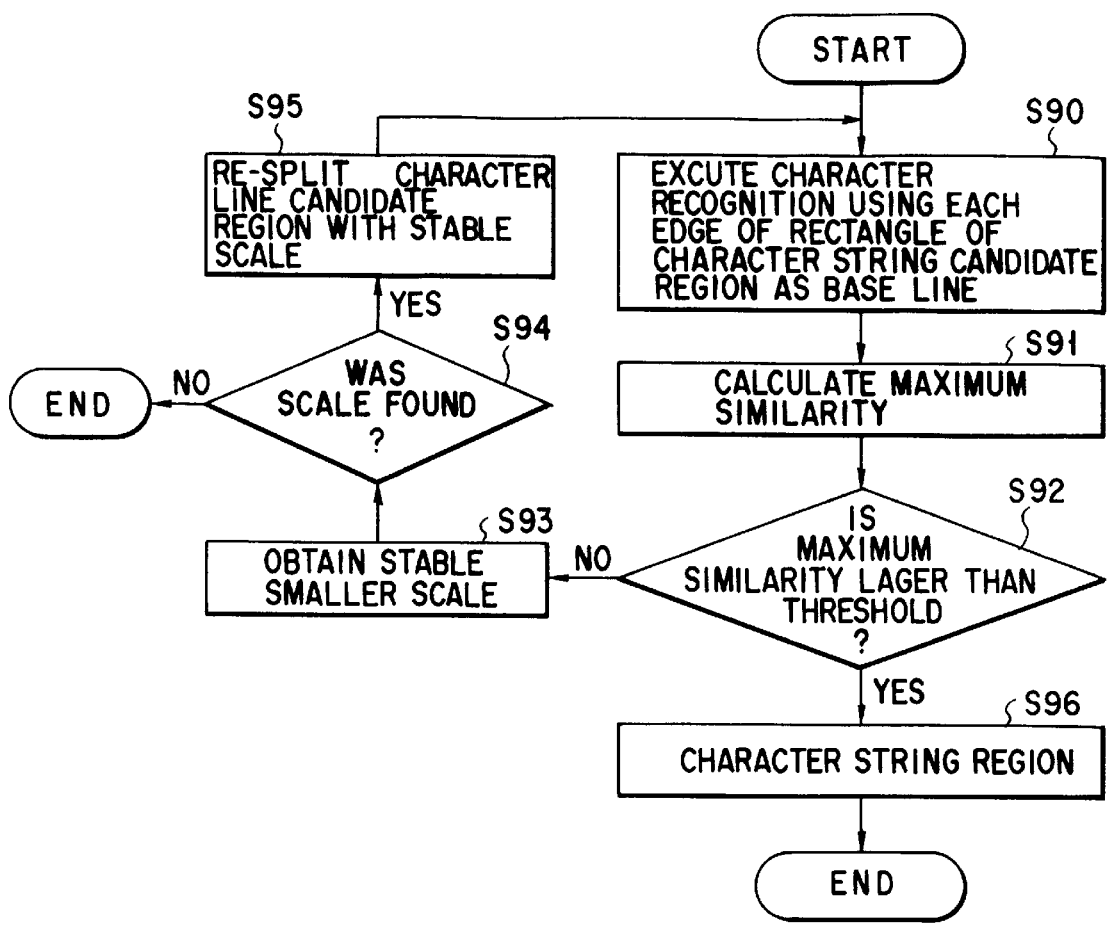
FIG. 10 is a flow chart illustrating the flow of processing for evaluating the apparent character string by character recognition in the embodiment.

FIG. 10 shows the procedure for forming the character string region by character recognition. When the direction of written characters is not known, the character string candidate region is read in every direction, using each edge of a rectangle surrounding character candidate patterns as a base line (step S90). If the direction of written characters is known to some degree, the direction of reading is determined on the basis of the knowledge. When character recognition is performed in a plurality of directions, the similarity between the pattern and the character in every direction is stored, and the direction in which maximum similarity is obtained is set as a base line. The maximum similarity is regarded as the final similarity of the character candidate (step S91). If the final similarity is greater than a predetermined threshold, the character candidate is determined as a character, and if the final similarity is less than the threshold, the character candidate is determined as a non-character (step S92). As regards the character string candidate region determined as the non-character, a smaller, stable scale of each character candidate region is found with reference to the three structure shown in FIG. 8 (step S93), and the character string candidate region is split to components having a connection relation based on the found scale and the split regions are delivered to the character recognizing section 7 (step S95). The splitting is repeated until the character string candidate region is determined as a character string or until the splitting becomes impossible. Steps S93 and S95 in FIG. 10 correspond to steps S42 and S43 in FIG. 5.

Figure 11:
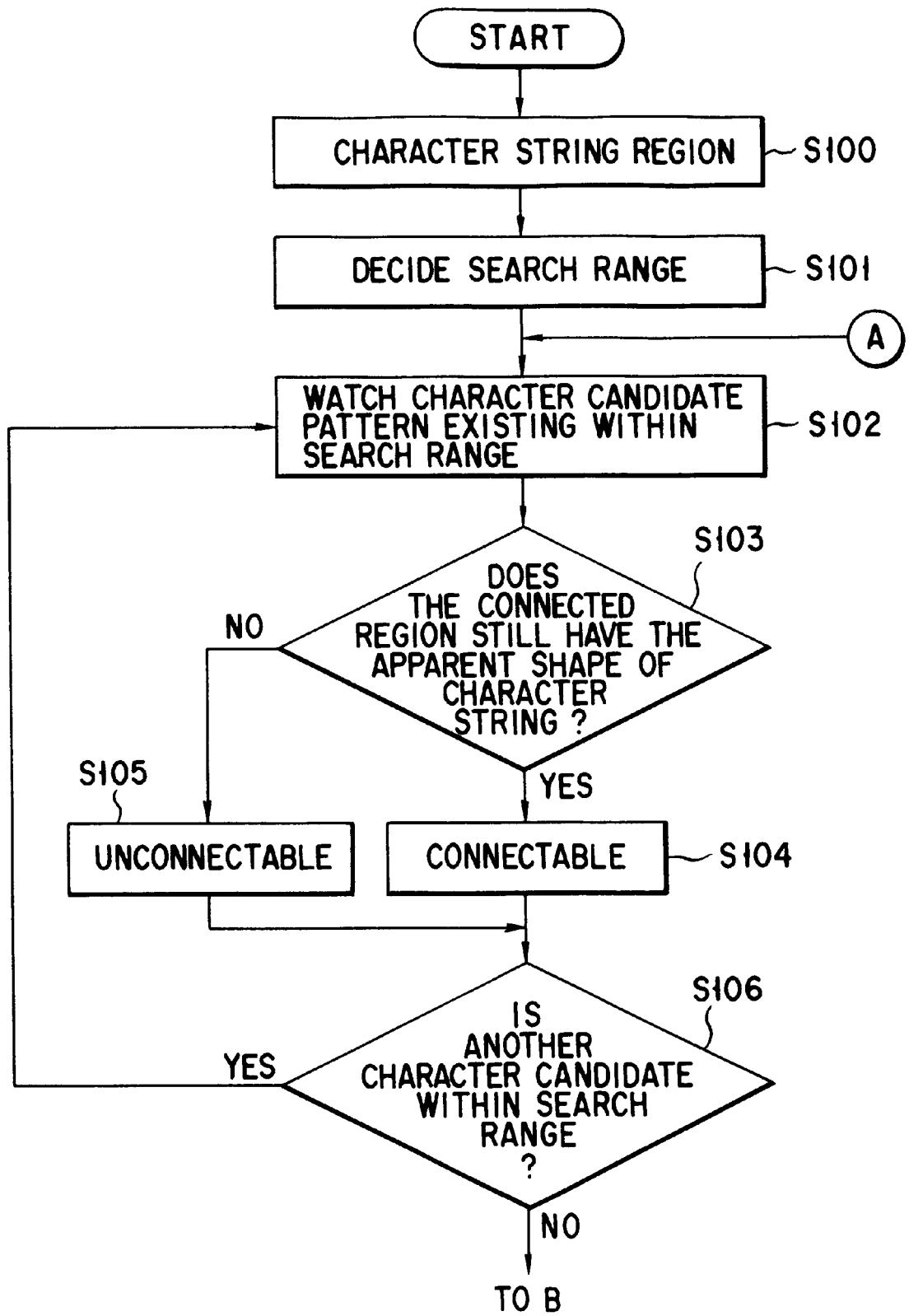
FIG. 11 is a flow chart illustrating the flow of processing for character-line-region reconstruction in the embodiment.
Figure 12:
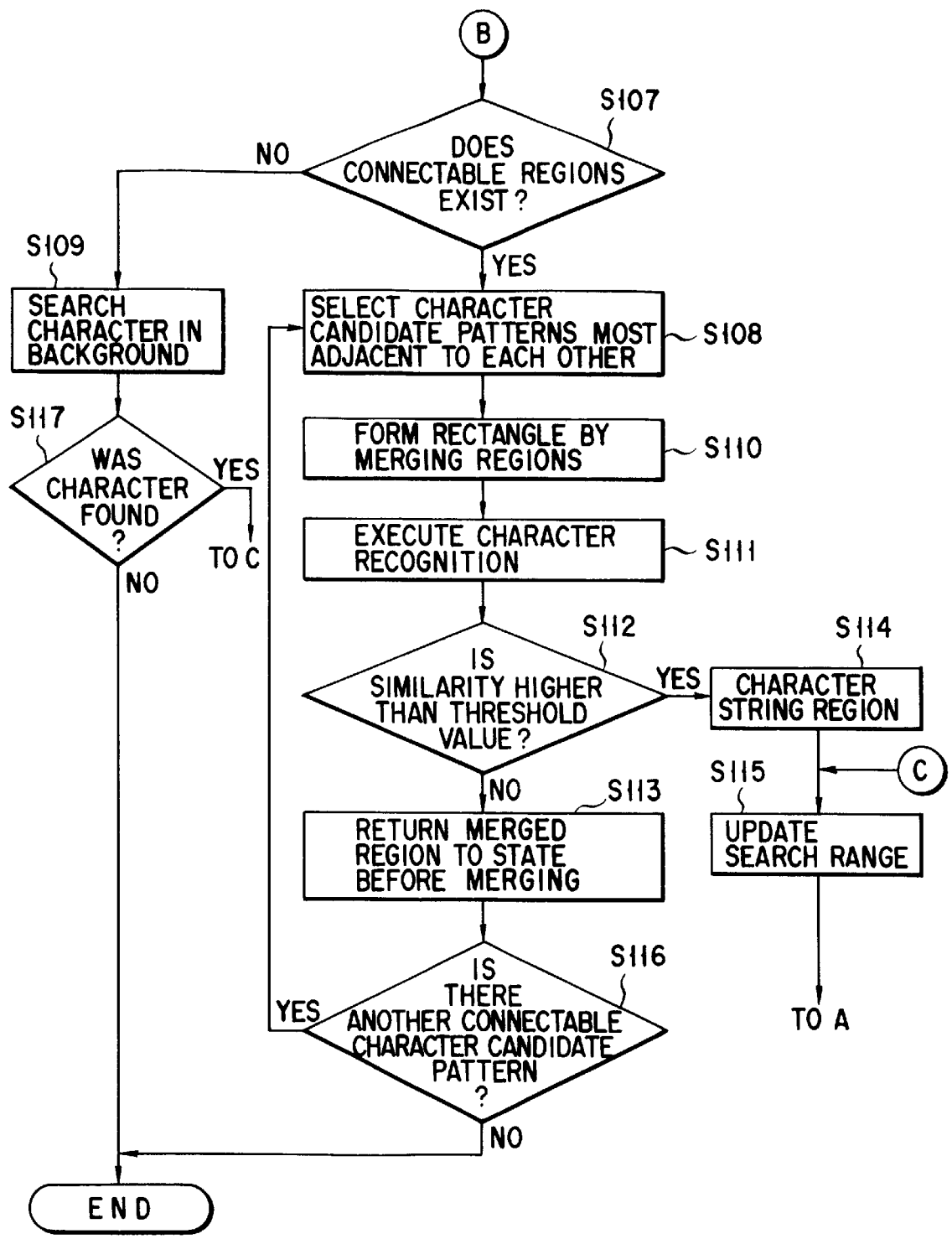
FIG. 12 is a flow chart illustrating the flow of the processing for the character-line-region reconstruction in the embodiment.

The character string region reconstruction process in step S25 in FIG. 3 will now be described. This process is performed mainly by the character string candidate region merging/splitting section 5. The character string region determined to be a character pattern through the processing in steps S20 to S24, is, in many cases, extracted in units of a character string in a region where character candidate patterns are sparse or extracted in units of a character in a region where character patterns and non-character patterns are densely present in a mixed fashion. The regions extracted in units of a character need to be merged to adjacent character candidate patterns in order to reconstruct them into a character string. The sizes of the characters and the direction of the character string can be estimated by referring to the patterns determined to be characters by character recognition. FIGS. 11 and 12 illustrate a method of reconstructing a character string from character regions. The data on the direction and size of the character string is extracted by using the character string candidate region information extracting section 4.

At first, a character string region to be treated is selected (step S100). Since the base line is determined from the result of the character recognition, the direction of the character string can be approximately determined on the basis of the determined base line. The search range for searching a character candidate pattern adjacent to the character candidate pattern of interest can be decided (step S101).

Figure 13A:
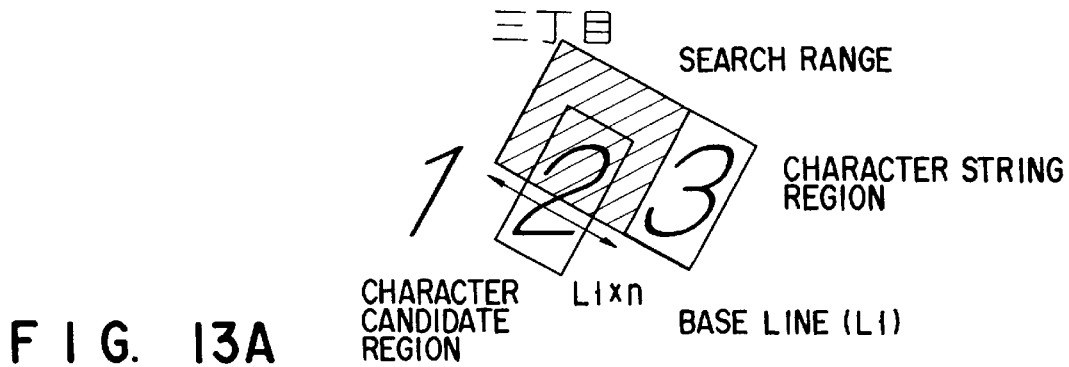
FIGS. 13A to 13C illustrate the state of character-line-region reconstruction in a character candidate searching area.
Figure 13B:
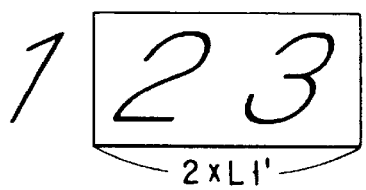
Figure 13C:
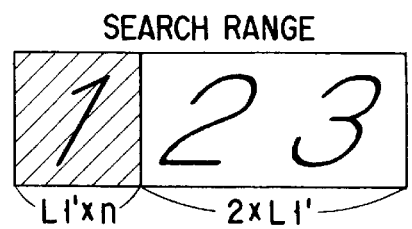

FIGS. 13A to 13C illustrate the method of deciding the search range in the present embodiment. The number of characters of the character patterns of interest can be recognized from the result of the character recognition. If the length of the base line is divided by the number of characters, the length L1 of the base line per character can be obtained. A rectangle having a base side of L1×n and a height equal to that of the character string region is assumed on an extension line of the base line. The assumed rectangle is set as a search range (FIG. 13A). The value n is a preset parameter of a non-negative real number.

One to be noted is selected from character candidate patterns contacting with the search range (step S102). It is determined whether the selected character candidate pattern is connectable to a character string of interest (step S103). The character candidate pattern is determined to be connectable when it is determined that the apparent shape of the character string is not lost even if it is merged to the selected character candidate pattern (step S104). The presence of the apparent character string is determined in the same manner as in step S41 in FIG. 5. The connectability is determined with respect to all character candidate patterns contacting with the search range (step S106).

If the connectable character candidate patterns are found in step S106 ("YES" in step S107), one of them which is closest to the character string of interest is selected. In the present embodiment, the distance between central points of patterns is set as the distance between rectangles (step S108). If the character candidate patterns are merged, the merged pattern is enclosed in the same rectangle (FIG. 13B) (step S110). The merged character candidate pattern is delivered to the character recognizing section 7 and it is determined whether it is a character string (steps S111 and S112).

If it is determined from the result of the character recognition that the merged pattern is a character string, the rectangle enclosing the merged pattern is regarded as a character region (step S114). Then, as shown in FIG. 13C, the character search range is updated on the basis of a new base line (step S115). The control routine returns to step S102 to search a connectable pattern.

If the merged pattern is not determined to be a character string as a result of character recognition, the merged pattern is split to constituent elements in the pre-connection state (step S113). If there is another connectable character candidate pattern which may form a character string region ("YES" in step S116), the control returns to step S108 to select a closest character candidate pattern and the subsequent processing is repeated. If there is no such connectable character candidate pattern ("NO" in step S116), the processing is completed. The method of forming the rectangle is the same as in step S51 in FIG. 6, and the method of determining the character string is the same as in step S92 in FIG. 10.

On the other hand, if there is no connectable candidate pattern in step S106 ("NO" in step S107), a character candidate pattern included in the search range is formed, as will be described later, and it is determined once again whether the pattern is connectable. If a connectable pattern is found, it is merged (step S109). If there is a connectable pattern ("YES" in step S117), the control returns from step S115 to step S102 and the processing is continued. If there is no connectable pattern ("NO" in step S117), the process is completed.

Figure 15A:
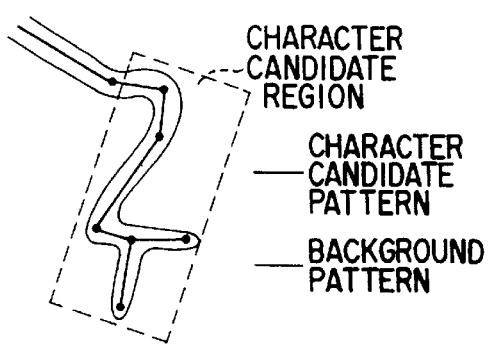
FIGS. 15A to 15E are views for describing the method of processing a thin line element by using a shaping region.
Figure 15B:
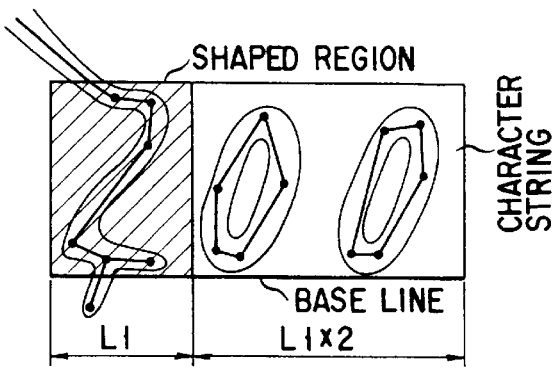
Figure 15C:
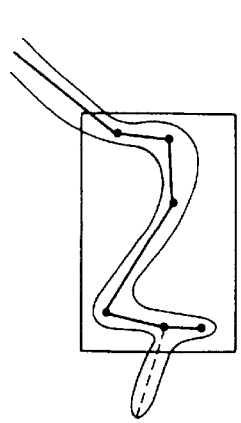
Figure 15D:
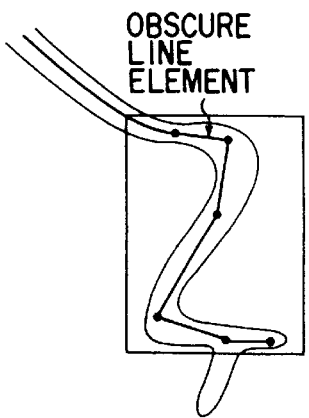
Figure 15E:
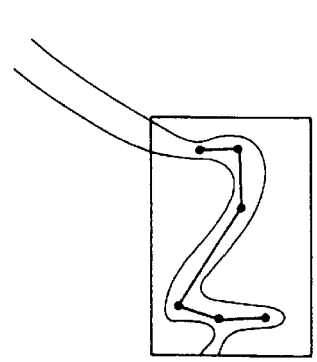
Figure 14:
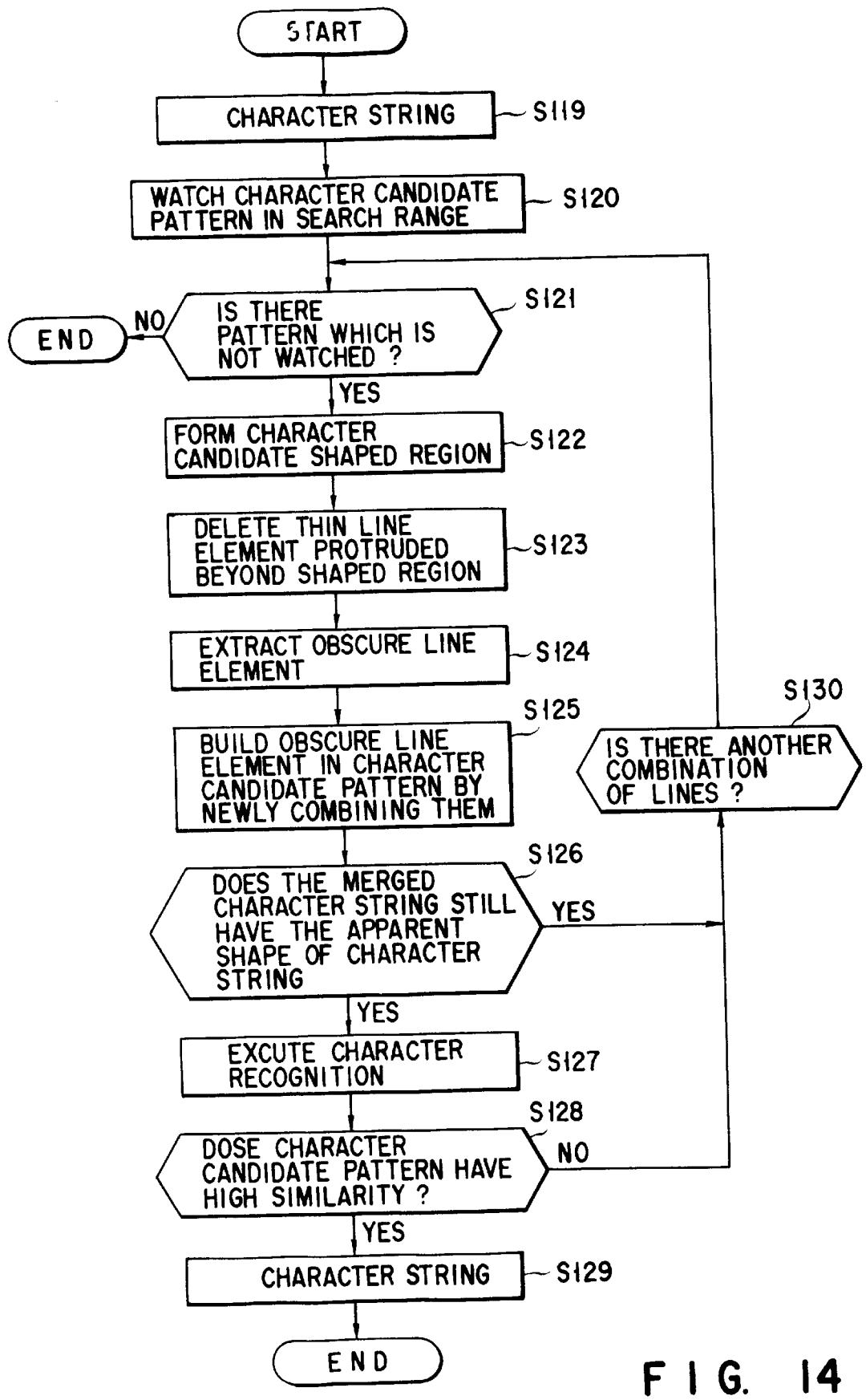
FIG. 14 is a flow chart illustrating the flow of processing for extracting a character candidate pattern from a background pattern in the embodiment.

FIG. 14 illustrates a method of forming the character candidate pattern in step S109. The process for forming the character candidate pattern is performed by using the character string candidate region extracting section 3. A character pattern, which blends into a background pattern and has a portion treated as a portion of the background pattern, or a character pattern including, as a portion thereof, the background pattern contacting with the character pattern, is shaped into a correct character pattern by the present process. For example, a character candidate pattern shown in FIG. 15A blends into a background pattern. Thus, a portion of character "2" is missing and an excess line element is connected to a bottom side of the character candidate pattern. This character candidate pattern is shaped into a correct character pattern, "2", as shown in FIG. 15E. In this process, a character string of interest is selected at first (step S119), and then a character candidate pattern in a search range is set as an object of processing (step S120). A region, which is considered to include an adjacent character, is defined as a character candidate forming region, on the basis of the base line of the character string of interest and the height of the characters (step S122). In the present embodiment, a rectangle, which has a bottom side with a one-character length of a base line and has a height equal to that of a character string of interest, is formed as a character candidate shaping region on an extended line of the base line of the character string of interest (FIG. 15B). A thin line element protruded beyond the character candidate shaping region, among thin line elements forming the character candidate pattern, is deleted from the character candidate pattern (step S123). In FIG. 15C, a thin line element indicated by a dotted line, which protrudes from the shaping region, is deleted. Then, a non-character pattern contacting with the character candidate pattern is searched as a contacting background pattern. A thin line element included in the character candidate shaping region, among the thin line elements forming the contacting background pattern, is extracted as an obscure line element. In FIG. 15D, one obscure line element is extracted (step S124). When there are an N-number of extracted obscure line elements, these obscure line elements are combined in the character candidate pattern in any possible combination, with the number of obscure line elements to be combined varied from 0 to N (step S125). For example, at first, none of the obscure line elements is combined in the character candidate pattern. Then, a freely chosen one of the obscure line elements is combined. Subsequently, freely chosen two of the obscure line elements are combined. Each time the combination is varied, it is determined whether the merged character string candidate pattern still have the shape of an apparent character string (step S126). This step of determination is similar to step S41 in FIG. 5. If the merged character string candidate pattern has been determined to still have the shape of the apparent character string, it is subjected to character recognition (step S127) and the presence of a character string is determined on the basis of similarity (step S128). If the presence of the character string is determined, the characters are merged (step S129). In FIG. 15E, character "2" is recognized when the obscure line element has been combined in the character candidate pattern.

If the presence of a character string is not determined and there remains a combination of obscure line elements which has not yet been adopted, the combination is adopted. If all combinations have been adopted, other character candidate patterns in the search range are shaped. If all the other character candidate patterns have been shaped and there is no connectable pattern, the process is completed. The determination of the presence of a character string is the same as in step S92 in FIG. 10.

A graphic pattern, which has been determined to be a character string from among various graphic patterns appearing on the face of a paper sheet in the above manner, is, for example, coded and output from the character string determining section 6.

As has been described above, according to the present embodiment, a character candidate region is extracted on the basis of the complexity of a character pattern. Thus, even if there is no knowledge of the shape of a background pattern, the character candidate region can be extracted. In addition, a character pattern and a non-character pattern are discriminated by character recognition. Therefore, there is little possibility that a non-character pattern is treated as a character string.

The tree structure describing the distribution information of character candidate patterns in this embodiment represents the variation of connection relation in relation to the variation in merging range (scale). When character candidate patterns are uniformly distributed, the connection relation therebetween varies uniformly in accordance with an increase in merging range. When character candidate patterns are locally distributed, the connection relation does not vary uniformly even if the merging range is increased. By making use of this feature, a proper merging range can be determined. For example, when a region formed by merging some adjacent patterns, such as a region of a Chinese character comprising a left-hand radical and a right-hand radical, is isolated from other patterns, such a merging range can be determined that the left-hand radical and right-hand radical are merged but the combination of the left-hand radical and right-hand radical is not merged to other patterns. In addition, such a merging range that the region of plural patterns is isolated from other patterns can be determined for each character candidate pattern.

In the present embodiment, the merging range for merging adjacent patterns is determined for each character candidate pattern. Thus, even if characters of different sizes and character strings of different character intervals are mixedly present on the face of the same paper sheet, the adjacent patterns can be merged with a proper merging range of each character. A character string isolated from other patterns can be extracted as a character string in this stage of processing.

In the present embodiment, a pattern, which has been determined to be not a character string on the basis of the shape of a merged pattern or the result of character recognition, is split in consideration of stability of character candidate pattern distribution. Until the split pattern is determined to be a character or further splitting of the split pattern becomes impossible, it is repeatedly determined on the basis of the shape and character recognition whether the split pattern is a character. In general, many non-character patterns are included in a region where character candidate patterns are densely present. In the prior art, it is difficult to form a character string from such a region, when the sizes of characters and the directions of character strings are not known. According to the present embodiment, however, even if a non-character pattern and a character pattern are erroneously merged into a single character string, the character string is determined to be a non-character string pattern and split into constituent elements. Finally, each character is extracted. If the character region is determined, the size of each character and the direction of the character string can be estimated. Thus, the character string including the characters can be easily constructed. Making use of this feature, the character string region is reconstructed and the character string can be exactly extracted from the region where character candidate patterns are densely present.

As has been described above, according to the present invention, the character candidate region extracted from the image on the paper sheet is subjected to actual character recognition. Using the recognition result, the character string region is determined. Thus, if only a conventional dictionary pattern is provided, detailed knowledge of graphic patterns other than characters is not needed and the character string can be exactly extracted.

Furthermore, when the character candidate regions are merged, the variation of connection relation in relation to the variation in pattern merging range is referred to. Thereby, the pattern merging range can be set at each location on the paper sheet in accordance with the degree of density of patterns. Thus, the character string can be extracted even if character strings having different sizes, different directions and different character intervals are mixedly present on the paper sheet.

Moreover, the character string is reconstructed on the basis of the pattern determined to be a character as a result of character recognition. Thereby, the character string can be exactly extracted even from the region where patterns are densely present.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A character string region extracting apparatus comprising:

image information output means for generating image information having characters and a graphic pattern other than the characters mixed therein;

extracting means for extracting a plurality of primitives from the image information;

character string candidate region forming means for generating character candidate regions from the primitives and merging the character candidate regions, to form at least one character string candidate region;

character recognizing means for subjecting the character string candidate region to a first character recognition process to divide the character string candidate region into a character region and a non-character region depending on whether or not the character string candidate region is recognized as a character, dividing a pattern determined to be a non-character region into new character string candidate regions, and determining by a second character recognition process whether the new character string candidate regions are character patterns or non-character patterns, said character recognizing means repeating a process of dividing the pattern determined to be a non-character region and the second character recognition process until the character candidate region is determined to be a character pattern; and character string region extracting means for extracting a character string region from said character string candidate region recognized by said character recognizing means.

2. The character string region extracting apparatus according to claim 1, wherein said character string candidate region forming means includes means for generating said character candidate regions on the basis of a combination of said primitives.

3. The character string region extracting apparatus according to claim 1, wherein said character string candidate region forming means has a knowledge of a shape of a background pattern and includes means for discriminating said character candidate regions from said background pattern on the basis of said knowledge.

4. The character string region extracting apparatus according to claim 1, wherein said character string candidate region forming means includes means for determining a region having a complex line pattern to be said character candidate region.

5. The character string region extracting apparatus according to claim 1, wherein said character string candidate region forming means includes means for determining a rectangle enclosing a character candidate pattern constituted by said primitives to be said candidate region.

6. The character string region extracting apparatus according to claim 5, wherein said character string candidate region forming means enlarges the rectangle of the character candidate region and merges the character candidate regions contacting with said enlarged rectangle, thereby forming the character string candidate region.

7. The character string region extracting apparatus according to claim 1, wherein said character string region extracting means determines a base line of a character string of the character string candidate region on the basis of a result of the character recognition, and merges character string candidate regions in a direction of the character string determined by the base line, while determining the presence of an apparent character string, thereby producing the character string region.

8. The character string region extracting apparatus according to claim 7, wherein said character string region extracting means includes means for shaping a character pattern including a background pattern as a portion thereof into a correct character pattern, and said shaping means determines to be a character candidate shaping region a rectangle having a bottom side of a one-character length of a base line and a height equal to that of the character string on an extended line of the base line of the character string, deletes a thin line element protruded from the character string shaping region, extracts thin line elements included in the character candidate shaping region as obscure line elements, and subjects combinations of the obscure line elements to the character recognition.

9. A character string region extracting apparatus comprising:

image information output means for generating image information having characters and a graphic pattern other than the characters mixed therein;

extracting means for extracting a plurality of primitives from the image information;

character string candidate region forming means for forming a character string candidate region from said primitives;

character recognizing means for subjecting the character string candidate region to a first character recognition process;

apparent character string determining means for determining whether said character string candidate region is a character string region or a non-character string region on the basis of a result of the first character recognition process performed by said character recognizing means; and dividing means for dividing said character string candidate region into the character string region and the non-character string region in accordance with a determination made by said determining means, said dividing means dividing said non-character string region determined by said determining means into new character string candidate regions, and determining by a second character recognition process whether the new character string candidate regions are character patterns or non-character patterns, said character recognizing means repeating a process of dividing the pattern determined to be a non-character string region and the second character recognition process until the character string candidate region is determined to be a character pattern.

10. The character string region extracting apparatus according to claim 9, wherein said character string candidate region forming means has a knowledge of a shape of the graphic pattern other than the character and determines the graphic pattern other than the character to be a character candidate region.

11. The character string region extracting apparatus according to claim 9, wherein said character string candidate region forming means determines that a region with a complex distribution of the primitives is a character candidate region, and merges one or more character candidate regions according to a predetermined condition, thereby generating the character string candidate region.

12. The character string region extracting apparatus according to claim 9, wherein said character string candidate region forming means comprises:

means for generating character candidate regions from the primitives according to a predetermined condition;

means for extracting said character string candidate regions by varying a merging range of the character candidate regions used for generating the character string candidate region;

means for determining an effective merging range on the basis of information obtained from a variation in shape of the character string candidate region in relation to a variation in the merging range; and means for outputting the character string candidate regions generated from the character candidate regions according to the effective merging range.

13. The character string region extracting apparatus according to claim 9, further comprising character string candidate region reconstruction means for performing at least one of congregation and splitting of the character string candidate region on the basis of a result of determination by the apparent character string determining means, thereby generating a new character string candidate region.

14. The character string region extracting apparatus according to claim 13, wherein said character string candidate region reconstruction means includes at least one of means for splitting the character string candidate region determined to be other than the character string region into a plurality of character string candidate regions and delivering the split character string candidate regions to the character recognizing means, and means for congregating, based on information on a character arrangement direction extracted from the character string candidate region determined to be the character string region, another character string candidate region into said character string candidate region and delivering the merged region to said character recognizing means.

15. A character string region extracting method, comprising:

extracting primitives from input image information;

forming a character string candidate region from the primitives;

subjecting the character string candidate region to a first character recognition;

determining whether the character string candidate region is a character string region or a non-character string region, on the basis of a result of the first character recognition;

dividing a pattern determined to be a non-character string region in said determining step into new character string candidate regions; and determining by a second character recognition process whether the new character string candidate regions are character patterns or non-character patterns; and repeating a process of dividing the pattern determined to be a non-character string region and the second character recognition process until the character string candidate region is determined to be a character pattern.

16. The character string region extracting method according to claim 15, wherein in said step of forming the character string candidate region, when there is a knowledge of a shape of a graphic pattern other than a character, the graphic pattern other than the character is extracted and a non-extracted pattern is determined to be a character candidate region, and when there is no knowledge of the shape of the graphic pattern, a region with a complex distribution of the primitives is determined to be a character candidate region and one or more character candidate regions are combined according to a predetermined condition, thereby generating the character string candidate region.

17. The character string region extracting method according to claim 15, wherein in said step of forming the character string candidate region, character candidate regions are formed from the primitives according to a predetermined condition, a plurality of character string candidate regions are extracted while varying a merging range of the character candidate regions used for forming the character string candidate regions, an effective merging range is determined on the basis of information obtained on the basis of a variation in shape of the character string candidate region in relation to a variation in the merging range, and the character string candidate regions formed from the character candidate regions according to the condition of the effective merging range is output.

18. The character string region extracting method according to claim 15, wherein at least one of a process of splitting into a plurality of character string candidate region the character string candidate region which has been determined to be not a character string region, and a process of merging, based on information on a character arrangement direction extracted from the character string candidate region determined to be the character string region, another character string candidate region to said character string candidate region, is performed and one of the split character string candidate region and the merged character string candidate region is subjected to the character recognition once again and it is determined whether said one of the split character string candidate region and the merged character string candidate region is the character string region.

19. A character string region extracting apparatus comprising:

extracting means for extracting a plurality of primitives from image information in which a character and a graphic pattern other than the character are mixedly present;

character string candidate region forming means for generating character candidate regions from the primitives and merging the character candidate regions, thereby forming at least one character string candidate region;

character recognizing means for subjecting the character candidate regions included in the character string candidate region to character recognition; and character string region extracting means for extracting a character string region from said character string candidate region by said character recognition;

wherein:

said character string region extracting means determines a base line of a character string of the character string candidate region on the basis of as result of the character recognition, and merges character candidate patterns in a direction of the character string determined by the base line, while determining the presence of an apparent character string, thereby producing the character string region;

said character string region extracting means includes means for shaping a character pattern including a background pattern as a portion thereof into a correct character pattern; and said shaping means determines a character candidate shaping region to be a rectangle having a bottom side of a one-character length of a base line and a height equal to that of the character string on an extended line of the base line of the character string, deletes a thin line element protruding from the character string shaping region, extracts thin line elements included in the character candidate shaping region as obscure line elements, and subjects combinations of the obscure line elements to the character recognition.

* * * * *